United States Patent [19]

Doucet

[11] Patent Number: 5,152,895
[45] Date of Patent: Oct. 6, 1992

[54] METHOD FOR CLEANING FILTER ELEMENTS AND FILTER FOR IMPLEMENTING IT

[76] Inventor: Charles Doucet, 13, avenue Léonard-Sismondi, 1224 Chêne-Bougeries, France

[21] Appl. No.: 613,786
[22] PCT Filed: Apr. 10, 1990
[86] PCT No.: PCT/CH90/00100
  § 371 Date: Dec. 18, 1990
  § 102(e) Date: Dec. 18, 1990
[87] PCT Pub. No.: WO90/12634
  PCT Pub. Date: Nov. 1, 1990

[30] Foreign Application Priority Data
  Apr. 25, 1989 [CH] Switzerland ............ 1568/89
  Jul. 28, 1989 [CH] Switzerland ............ 2828/89

[51] Int. Cl.$^5$ ................ B01D 24/48; B01D 24/00
[52] U.S. Cl. .................... 210/636; 210/89; 210/90; 210/106; 210/141; 210/323.2; 210/340; 210/354; 55/284
[58] Field of Search ........... 210/323.2, 333.1, 106, 210/107, 108, 355, 636, 89, 90, 141, 340, 343, 354; 55/284, 285

[56] References Cited

U.S. PATENT DOCUMENTS

| 3,169,109 | 2/1965 | Hirs | 210/107 |
| 3,356,215 | 12/1965 | Miles, Jr. | 210/108 |
| 4,439,327 | 3/1984 | Müller | 210/108 |
| 4,781,825 | 11/1988 | Grimes et al. | 210/107 |
| 4,876,006 | 10/1989 | Ohkubo et al. | 210/321.2 |
| 5,074,895 | 12/1991 | Hunsberger | 55/284 |

FOREIGN PATENT DOCUMENTS

| 3115716 | 11/1982 | Fed. Rep. of Germany . |
| 2332047 | 6/1977 | France . |
| 2374935 | 7/1978 | France . |
| 9012634 | 11/1990 | PCT Int'l Appl. ........... 210/323.2 |
| 516331 | 1/1972 | Switzerland . |
| 532409 | 2/1973 | Switzerland . |
| 597894 | 4/1978 | Switzerland . |

Primary Examiner—Robert A. Dawson
Assistant Examiner—Ana M. Fortuna
Attorney, Agent, or Firm—Young & Thompson

[57] ABSTRACT

In relation to time intervals or pressure loss, the successive flushing via the same flushing channel (10) of several filter elements (7) is brought about by the direct sweeping of the internal surface of said elements (7) by the fluid to be filtered. It comprises a tubular body (1) and an upstream distribution plate (4), each feeding a filter element (7) extending axially inside the body, and a downstream aperture. At its downstream end there is a distributor comprising several inlets linked to the downstream end of the elements (7), said inlets being linked by channels (22) to a single outlet, itself linked to a flushing branch pipe (8) opening laterally outside the body (1). This distributor comprises a rotor (18) which, depending on its angular position, separately connects each of its inlets to the shared outlet of distributor.

10 Claims, 3 Drawing Sheets

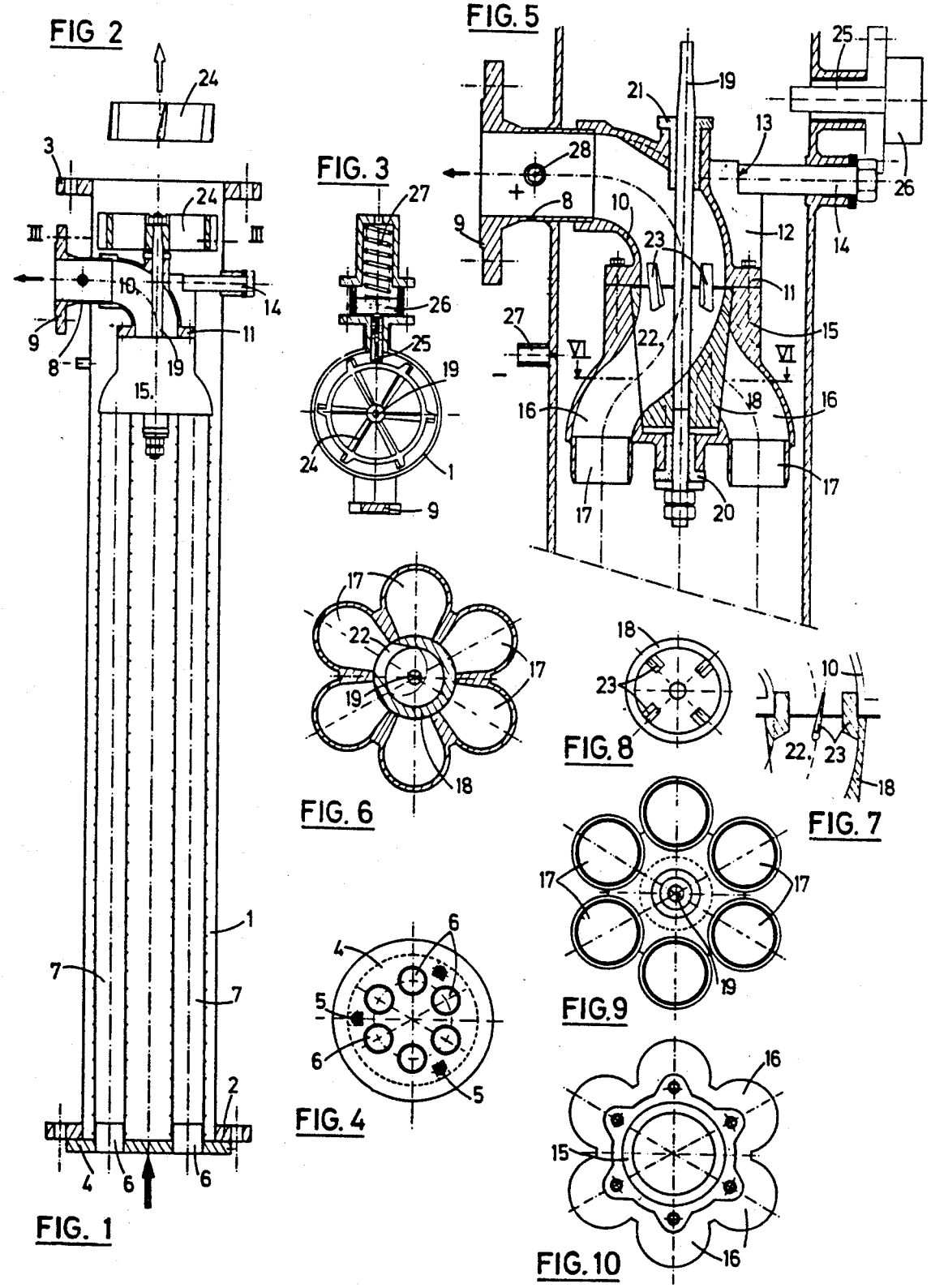

METHOD FOR CLEANING FILTER ELEMENTS AND FILTER FOR IMPLEMENTING IT

FIELD OF THE INVENTION

The present invention has for aim a method of filtration of a fluid, generally rough water or dirty water, and a filter to carry it out.

BACKGROUND OF THE INVENTION

In a general way quick filters (Strainer) which are automatic are equipped with mechanical systems which are motorized to ensure their cleaning. These mechanical systems necessitate plurimetallic constructions which form corrosive electrolytic couples. On the other hand the frictions in dirty water containing very often sand cause a very rapid wearing off of the apparatus.

Finally, these "strainers" are always cleaned by means of a counter current (Back-Wash) which is a drawback particularly when there are fibers creating a mat or interlace within the filtrating elements.

Swiss patents 516 331, 532 409 and 597 894 have presented an automatic filter having none of these three drawbacks, no complicated mechanics, no "Backwash." The use of this system has demonstrated its security and riability.

These filters which constitute an important technical progress over the preceeding filters have nevertheless certain drawbacks which are the following:
a) Each filtering element has to be equipped with a cleaning valve. To obtain a non-stop filtration it is necessary to have multi-element filters therefore equipped with several valves. The more elements there are, therefore valves, the more the influence of the cleaning of the filtrated outflow is low, but the more the filter is expensive for its construction and installation.
b) The tubular envelop requires an elaborated construction in a qualified workshop and uses high quality materials, in principal stainless steels, which leads to a high manufacturing cost of the filter.

OBJECTS OF THE INVENTION

The present invention aims to obviate to the precited drawbacks.

The present invention has for its object a method of filtration of a fluid as well as a filter to carry it out which distinguishes itself by the features described and claimed in the following.

BRIEF DESCRIPTION OF THE DRAWINGS

The attached drawing shows schematically and by way of example two embodiments of a filter according to the present invention.

FIG. 1 is a longitudinal cross section of the filter.
FIG. 2 shows the actuating wheel of the filter distributor seen from the side.
FIG. 3 is a cross section along line III—III of FIG. 1.
FIG. 4 is a top view of the plate located upstream of the filter.
FIG. 5 is a longitudinal portion cross section of the filter shown at FIG. 1, at a greater scale.
FIG. 6 is a cross section along line VI—VI of FIG. 5.
FIG. 7 is a partial longitudinal cross section of the filter, at the scale of FIG. 5, the rotor of the distributor being in an other angular position and the axis of the rotor being taken out.
FIG. 8 is a top view of the rotor of the distributor.
FIG. 9 is a view from underneath of the distributor.
FIG. 10 is a top view of the distributor without its rotor.

SUMMARY OF THE INVENTION

Figure 11:
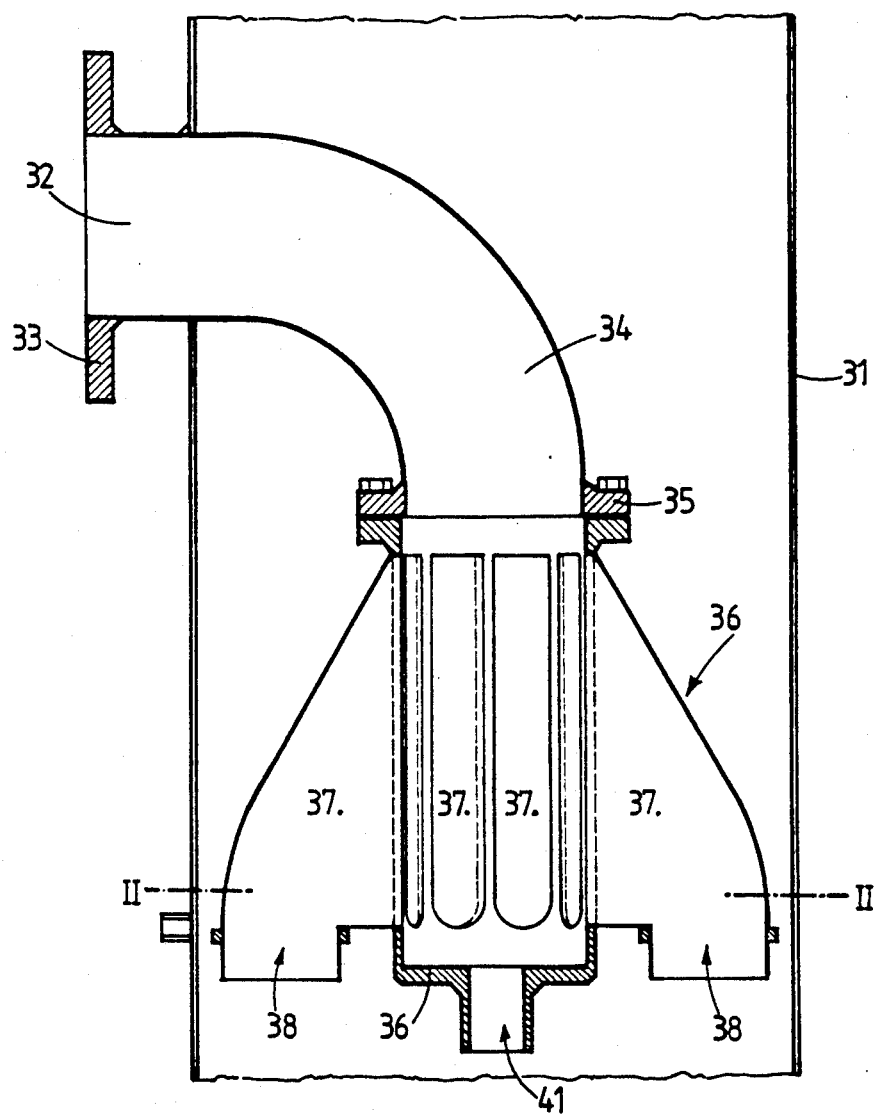
FIG. 11 is a longitudinal cross section of the downstream portion, comprising the distributor of the filter according to a second embodiment.

Generally speaking the "universal filter" does not exist since the filtration may be very diversified. However, it seems possible to approach the "Ideal Filter" in a given field of the filtration.

The objective of the present invention is to obtain an economic automatic filter, as reliable as the one described in the precited patents. This filter shall also be inserted in a duct having the same or sensibly the same diameter, which is for example, oblique or vertical. The evacuation of the impurities shall be done through only one branchpipe taking out a cleaning or flushing flow, without stopping or disturbing the filtration and the main circuit of fluid flow.

Moreover this filter has to be economical and this is obtained here thanks:
a) to the fact that all active parts of this new filter are light and constructed, in an elaborate manner out of relatively costly materials (stainless, steel for example), but their repetitive manufacture enables series which will diminish their manufacturing cost. These sophisticated parts will essentially be the filtrating elements and the compact distributor;
b) to the fact that the tubular envelope (or sensibly tube) may be constructed very economically and in any small workshop out of cheap materials. Plastic material can for example easily replace stainless steel;
c) to a construction where the elements and the distributors are fixed into an envelope through simple screws and with direct contact without joints. It is to be noted that two or three abutments screws fasten the distributor against the flushing branchpipe on which it is fixed.

This type of construction without weld enables, if necessary, to ensure a simple and economic assembly of parts which are constructed in different workshops, chosen as a function of their specialization or of their price level. It enables also to use, without risk, of steels coated with epoxy paints or teflon for example.

DETAILED DESCRIPTION OF THE INVENTION

The filter according to the invention comprises a tubular body 1 provided at each of its ends with flanges 2,3 enabling to fix it in a fluid duct, with a portion of this duct presenting the same diameter as the body 1. The upflow end of the filter is provided with a plate 4, fixed by screws 5 on the flange 2, presenting sleeves 6 merging within the body 1 and constituting guides for the tubular filtrating elements 7.

The body 1 is provided near its downstream end with a flushing branchpipe 8, that is a duct connecting the inside to the outside of the body. This derivation presents an outside end provided with a flange 9 for its connection to a flush valve (not shown). The other end of this branchpipe 8 is slid within an elbow 10 terminated by a flange 11 coaxial to the body 1. The curve 10 is provided with at least one rib 12 presenting a rest surface 13 cooperating with the end of a screw 14, screwed into the body 1, maintaining the curve 10 in service position securely fastened and without joint against branchpipe 8.

A distributor is formed of a divider 15 fixed to the flange of the elbow 10 and comprising an outlet corresponding to the diameter of the end of the elbow 10 on which it is fixed and connected by means of internal channels of preferably decreasing cross sections 16 to inlets 17 equal in number to the sleeves 6 and aligned longitudinally on them.

The filtrating elements are slid preferably without joints on the sleeves 6 and on to the corresponding entrances 17 and extend inparallel one to the other. This distributor comprises further a rotor 18 pivoted in the divided coaxially to the body 1. This rotor 18 is fastened with a shaft 19 pivoted in bearing 20 of the divider 15 and 21 of the elbow 10.

The rotor 18 has a frusto conical outside shape located into a cavity having the same shape of the divider, and in service position its upper face abuts the flange 11 of the elbow 10. The rotor 18 is provided with a channel 22 permitting to connect individually each channel 16 of the divider to the elbow 10 according to the relative position of the rotor with respect to the divider.

In the embodiment shown the rotor 18 is provided with wings 23 extending radially thin the channel 22 and axially within the elbow 10. These wings present a slope with respect to the axis of the rotor and constitute means for driving the rotor into rotation through the flow of the fluid crossing the channel 22, that is the cleaning flow.

The upper part of the shaft 19 carries a wheel 24 intended to be driven into rotation by the principal fluid flux. The abutment, formed by the end of the rod 25 of a piston 26 located in a chamber subjected to the action of a spring 27, is located in normal position onto the path of the wings of the wheel 24 determining thus the angular positions of the shaft 19 and thus of the rotor 18 in which the channel 22 of this rotor coincides with one of the channels 16 of the divider 15. It is evident that the number of wings or of abutment members of the wheel 24 cooperating with the rod 25 is equal to the number of filtering elements 7 and of channels 16 of the divider 15.

The body 1 comprises further a duct 27 permitting to fix a member for measuring the downstream pressure of the filter, whereas the flushing pipe comprises a duct 28 permitting to fix a member for measuring the upstream pressure of the filter.

The described filter being mounted through its flanges 2,3 in a portion of duct having preferably the same diameter (not shown) operates as follows:

The fluid enters into the filter at the upstream end of the tube and splits in each of the filtrating elements which filter in parallel. The water for example flows through a filtration zone which is relatively narrow due to its speed and located at the downstream free ends of the filtrating elements.

This filtrating ring at the level of each element 7 gives filtrated water which traverses the wall of the filtrating element and flows through the downstream outlet of the filter, where it meets on its passage the wheel 24 intended to drive the rotor 18 of the compact distributor located between the filtrating elements and the wheel.

The study of this device has shown the difficulty there was to design a sufficiently compact distributor for not creating pressure losses in the main circuit (raw water /filtered water) flowing through this filter which is essentially tubular and approximately of the same diameter as one of the duct in which it is inserted. It was on the other hand necessary to design a flushing circuit ensuring the necessary outflow with a minimum of loss of pressure, in order to be able to use this filter with eventually low service pressures and of course also with high service pressures.

During its use the filter retains impurities which in depositing themselves at the end of the elements have the effect of moving the annular filtrating zones towards the upstream portion of the filtering elements.

When these zones reach the inlet of the filter, the filter is clogged up and the $\Delta p$ or differential pressure increases and induces a cleaning cycle.

In practice, one does not await this extreme situation since it is preferable to make a periodical program cleaning while maintaining a low pressure drop. This periodical cleaning can be programmed through a timer or through a pressure differential $p' \Delta p$.

When the washing cycle is actuated it is necessary to clean each of the filtrating elements 7 by flushing them. It is to be noted that the method do not use the traditional "Back-Wash" or counter current washing for the reasons indicated in the precited patents. The quick sweeping off of the filtrating surface is made in the same direction as the direction of the principal outflow of raw water and filtrated water. If the water contains fibers there is no risk of meshing and mating of the filtrating wall.

The energy losses are thus reduced to a minimum and practice as confirmed these has being low.

During the washing cycle, each element is flushed in turn. This is necessary to obtain a continuous filtration as well as a minimal flushing flow.

The washing cycle can be controlled in several manners:

1. The most secure manner, that is to say causing the minimum of wearing off consists in opening the flush valve during a short time and periodically when the rotor of the distributor is stopped in front of a window for the flushing out of one filtrating element 7. The stopping of the rotating distributor during the flowing out of the flushing considerably diminishes the wearing off of the flushing device and of the distributor.

One the flushing time (a few seconds) has elapsed, the flush valve closes again, the abutment shaft 25 maintaining the wheel 24 at rest connected to the rotor 18 of the distributor is retracted and the speed of the general flow in the filter slowly drives the wheel 24 until it abuts on this abutment shaft which came back nearly immediately to its place after having been retracted. It is to be noted that the rotation of the rotor of the distributor is made in steady water, the flushing circuit being closed, the wearing off is negligible.

Each element is thus flushed in its turn according to a program as a function of time.

This program causes a number of opening-closing of the flush valve equal to the number of filtrating elements, separated by time intervals during which the rod 25 is retracted and again placed in position in order to enable the step by step rotation of the wheel 24. Once this number is reached, the program waits for a predetermined duration of time or for the detection of a pressure differential Δ p' which is pre-established to repeat the washing cycle of the filtrating elements 7.

Should the filter become completely clogged, the filtrated water would no longer flow and thus the principal wheel would be sufficient to drive the rotor of the distributor.

To obviate, this drawback a secondary wheel 23 of the rotor 18, is located on the common washing flow to cause the rotation of the rotor 18.

Thus, when the clogging or simultaneously an abnormal and exceptional increase of the Δ p (pressure loss of the filter) give the order to carryout a washing cycle, it is possible in this case to retract the abutment shaft 25 of the wheel 24 and to open the flush valve.

The action of the very rapid flushing flow on the secondary wheel 23 causes simultaneously the washing of element 7, the setting in rotation of the rotor 18 and therefore the washing of all the elements 7 alternatively. In this case the washing of the elements is made during the rotation of the rotor 18.

When the filter is cleaned, the Δp falls back to its normal working value, the flush valve closes and the locking of the wheel 24 through the rod 25 stops any movement of the distributor.

Therefore the filtration method which is put into practice by the described filter enables to realize an automatic or semi-automatic cleaning of the filter by the successive washing of each filtrating element through a direct flushing without "back-wash" of the filtrating surface this is accomplished without stopping the filtration and without causing heavy loss of pressures in the main circuit of raw fluid, or filtrated fluid as in the flushing circuit. This is achieved even though the assembly of filtering are inserted in a tube, or an envelope which is approximately tubular, and can be directly mounted in series on the duct to be protected and having generally the same diameter. This washing through a sweeping of each filtrating element is realized sequentially during a cleaning cycle, each filtrating elements 7 being successively connected to the flushing branchpipe by the advance of one step of the rotor of the distributor. This step-wise rotation of the rotor of the distributor is obtained either by the flow of the filtrated fluid or by the flow of the flushing fluid or even by any other input of outside energy, for example an electrical motor which would drive the shaft 19.

If the filtrated fluid flow or an outside energy source is used for driving the rotor in rotation, this is made step by step to avoid preferably that the rotor be in motion during the flushing of the filtrating elements so as to reduce the wearing off of the distributor.

In a variant of the filter which is not shown, one can mount in the same body 1- several assemblies of filtrating elements, each assembly being connected through a distinct distributor to a different washing branchpipe. So the filter will be relatively short, the length of a filtrating element is a function of its diameter.

This assembly has two advantages:
to use standard compounds which are constructed in series,
to permit a rigorously constant usable flow. The influence of the washing branchpipe being negligible which such a high number of filtrating elements.

Practically the essential elements of this new filter are:

1. A tubular body 1 having in principal the same diameter as the duct (not shown).
2. Several filtrating elements mounted in parallel.
3. A distribution plate 4 fixed at the entrance of the fluid.
4. A compact distributor comprised of elements 15 to 18 which is automatic, with a rotor 18 at the downstream end of the filter.
5. A main wheel 24 to set into movement a rotor 18 which is actuated by the main flow (raw water/filtrated water).
6. A secondary wheel 23 to set automatically in motion the rotor 18 actuated by the washing flow.
7. A flushing branchpipe 8 for taking out the impurities. A flush valve (not shown) which is normally closed against the flushing branchpipe 8. This automatic valve, which is programmed opens as a function of the abnormal increase of the pressure drop of the filter.
8. A device (piston 26 and abutment shaft 25) for positioning the rotor 18, the automatic control of which is made taking into account of the control of the automatic washing flush valve.
9. Two or three screws 14 maintaining the automatic distributor against the flushing branchpipe 8, in adequate position to maintain the filtrating elements.

Figure 12:
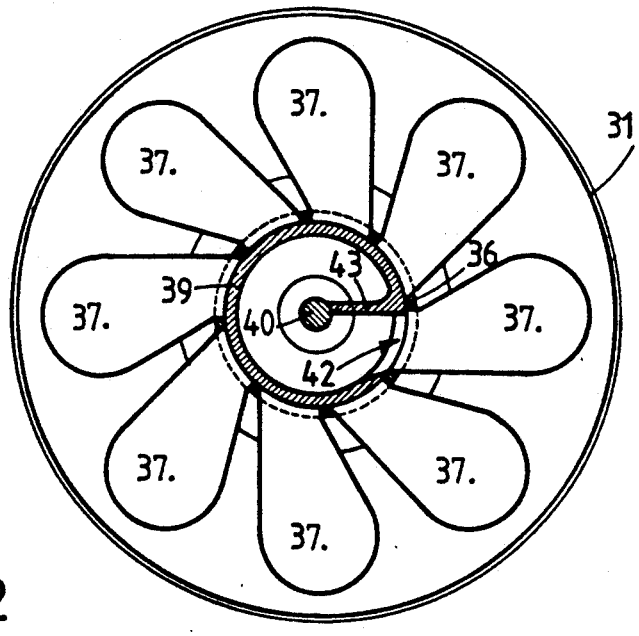
FIG. 12 is a transversal cross section of the filter along line II—II of FIG. 11.
Figure 13:
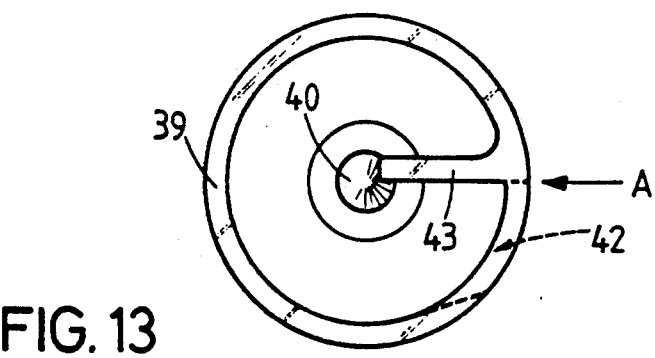
FIG. 13 is a top view of the distribution rotor of the FIG. 11.
Figure 14:
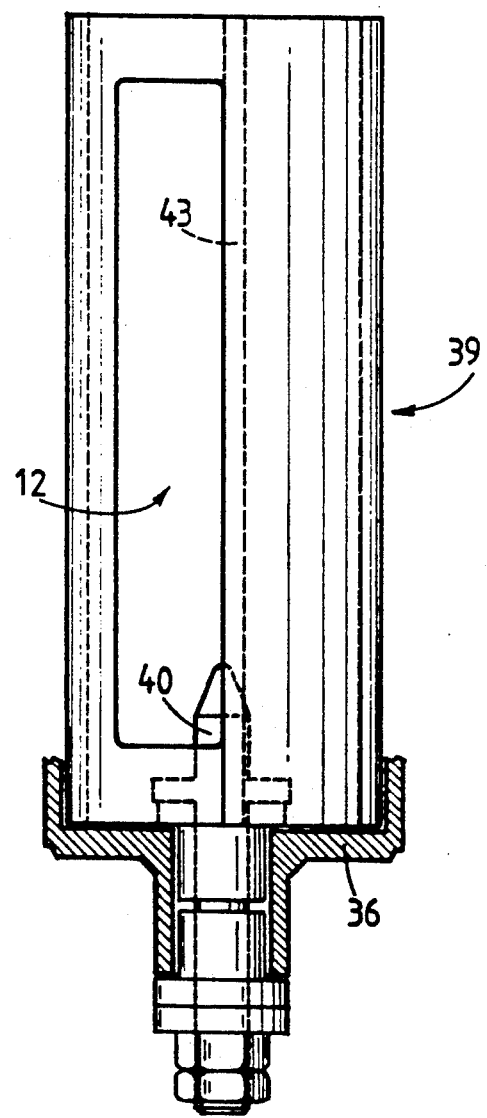
FIG. 14 is a side view of the rotor seen from A on FIG. 13.

The second embodiment of the filter shown at FIGS. 11 to 14 comprises a tubular body 31 provided at each of its ends which a flange permitting to fix it in a fluid duct, with a portion of this duct presenting the same or sensibly the same diameter as the body 31. The upstream end of the filter is provided with a plate, fastened by screws onto the flange, presenting sleeves merging within the body 31 and constituting guides for the filtrating elements which are tubular.

The body 31 is provided near its downstream end with a flushing branchpipe 32, which is connecting the inside to the outside of the body. This pipe has one outside end provided with a flange 33 in order to connect it to a valve (not shown). The other end of this pipe 32 has an elbow 34 terminated by a flange 35 which is coaxial to the body 31.

A distributor constituted by a divider 36 fixed to the flange 35 of the elbow 34 and comprising an outlet corresponding to the diameter of the end of the elbow 34 on which it is fastened, outlet which is connected by means of internal channels 37 to inlets 38 equal in number to the sleeves and aligned longitudinally on them.

These filtrating elements are slid preferably without joints onto the said sleeves and on the corresponding inlets 38 and extend in parallel one to the other.

The distributor further comprises rotor 39 pivoted in the divider 36 coaxially to the body 31. This rotor 39 is fastened with a shaft 40 pivoted in a bore 41 of the divider 36.

The rotor 39 presents an outside cylindrical or slightly conical shape and is housed in a cavity having the same shape in the divider 36 and in service position, its upper surface faces the flange 35 of the elbow 34. This rotor 39 is provided with a lateral opening 42 which permits to connect individually each channel 37 of the divider 36 to the elbow 34 according to the relative position of the rotor 39 with respect to the divider 36.

Seen in top view, the axis of the channels 37 of the distributor do not extend radially in direction of the longitudinal axis of the distributor 36, but are slightly displaced so that when the fluid flows through the distributor, it arrives tangentially into the central cylindrical cavity, in which cavity its rotor 39 is housed.

The rotor 39 is provided with a blade or radial wall 43 forming a member for driving the rotor 39 into rotation by the flushing fluid. This wall extends from the peripheral wall of the rotor in the direction of its axis on at least a part of this distance. This rotor 39 can also be mounted in a reversed way, upside down, it is thus reversible.

In normal operation of the filter, a flush valve connected to the elbow 34 is closed so that the all flow of fluid flows through the filtrating elements, crosses their permeable walls and flows downstream of the distributor 36 into the duct 31.

For the cleaning of the filter, the flush valve is opened, the fluid crossing through the filtering element which is connected to the channel 37 located in front of the aperture 42 of the rotor 39, penetrates into the rotor 39 tangentially provoking cyclonic movement of the fluid which strikes the wall 43 of the rotor before its evacuation by the elbow 34 and the flushingpipe 32. In doing so, the rotor 39 is driven into rotation, displacing its aperture 42 which comes thus successively in front of each channel 37 causing thus the successive flushing of each of these channels 37 and thus the cleaning of the corresponding filtrating elements.

Once the filter is cleaned through the flushing action, the valve is closed and the filter works again normally.

This embodiment of the distributor 36 is particularly advantageous since the rotor is very simple, and the distributor itself as well as the channel 37 may be made by matrix work or embossing, that is according to conventional technics of container manufacturing which do not necessitate any particular investment.

I claim:

1. Method of flushing a filter comprised of a plurality of filtrating elements, which comprises: carrying out as a function of a pre-established program, controlled by pre-established time intervals, or pre-established pressure loss, the successive flushing through a same flushing channel of said filtrating elements by directly sweeping the internal surface of said elements with fluid to be filtrated, and evacuating said fluid through said flushing channel.

2. Method according to claim 1, wherein each filtrating element is successively connected to a flushing pipe via a distributor having a movable member, said movable member being driven into rotation step by step through the combined action of a wheel driven by filtrated fluid and a retaining abutment.

3. Method according to claim 1, wherein each filtrating element is successively connected to a flushing pipe via a distributor having a movable member, said movable member being driven into continuous rotation through the action of a wheel driven by filtrated fluid.

4. Method according to claim 1, wherein each filtrating element is successively connected to a flushing pipe via a distributor having a movable member, said movable member being driven into continuous rotation or stepwise by means which are external to the filter.

5. Filter comprising a tubular body intended to be mounted within a fluid duct, and upstream distribution plate comprising openings each feeding a filtrating element extending axially within the body and a downstream outlet, said body including in the vicinity of its downstream end at least one distributor having several inlets connected to the downstream end of said filtering elements, said inlets being connected through channels to only one common outlet, said one outlet being connected via an elbow to a flushing branchpipe coming out laterally outside the body of the filter, said distributor further comprising a rotor adapted, depending on its angular position with respect to the distributor, to separately connect each of said inlets to the common outlet of the distributor.

6. Filter according to claim 5, wherein the downstream portion of the rotor includes wings forming a secondary wheel for driving the rotor into rotation by the flow of flushing fluid.

7. Filter according to claim 6, wherein the rotor is fastened to a shaft and the downstream end of the shaft carries a main wheel coaxial to the downstream outlet of the fluid and located into the downstream end of the body.

8. Filter according to claim 6, wherein the driving of the rotor into rotation is made stepwise between two abutment positions by means of a main wheel actuated by the principal flow of fluid after filtration.

9. Filter according to claim 5, wherein the distributor comprises a cylindrical central void in which each channel leads through an aperture which is laterally displaced with respect to the longitudinal axis of the distributor; and said rotor is cylindrical and located in said void and pivoted onto the distributor, said rotor presenting one lateral aperture as well as a member for driving said rotor into rotation.

10. Filter according to claim 9, wherein said member for driving said rotor into rotation is constituted by a blade or by a radial wall extending from the peripheral wall of the rotor at the most up to its longitudinal axis.

* * * * *

UNITED STATES PATENT AND TRADEMARK OFFICE
CERTIFICATE OF CORRECTION

PATENT NO. : 5,152,895
DATED : October 6, 1992
INVENTOR(S) : Charles DOUCET

It is certified that error appears in the above—identified patent and that said Letters Patent is hereby corrected as shown below:

On the title page, in Item 76, the applicant's address, change "France" to --Switzerland--.

Signed and Sealed this

Twelfth Day of October, 1993

Attest:

BRUCE LEHMAN

Attesting Officer

Commissioner of Patents and Trademarks